Aug. 8, 1972  G. W. MISSON  3,682,610
GAS HEARTH WITH PARTICULAR GAS-SUPPLY CHANNELS
Filed March 2, 1970  4 Sheets-Sheet 4
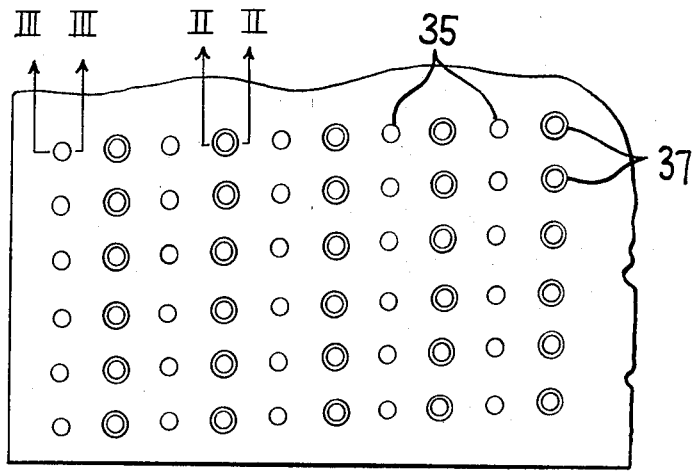
FIG. 4
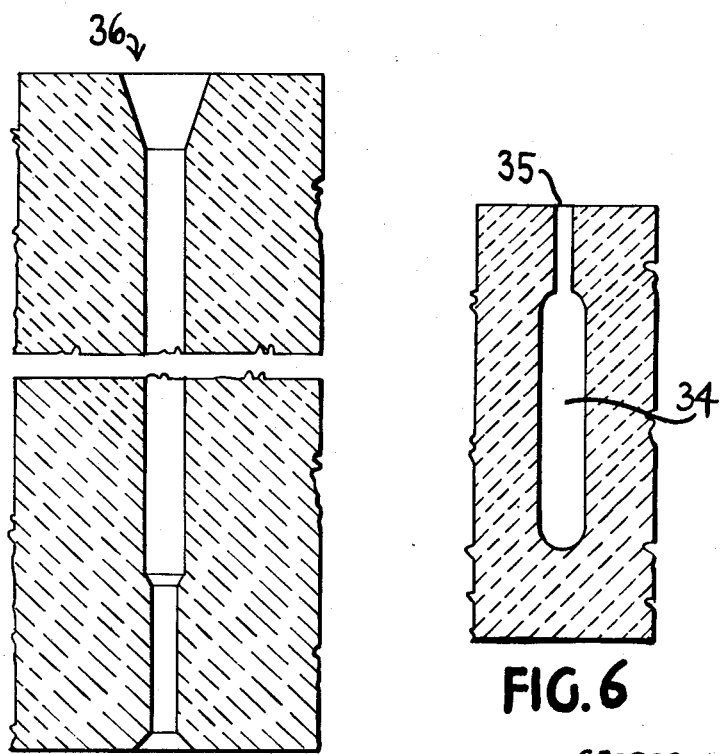
FIG. 5
FIG. 6
INVENTOR
GEORGE W. MISSON
BY
ATTORNEYS

United States Patent Office

3,682,610
Patented Aug. 8, 1972

3,682,610
GAS HEARTH WITH PARTICULAR GAS-SUPPLY CHANNELS
George W. Misson, Pittsburgh, Pa., assignor to PPG Industries, Inc., Pittsburgh, Pa.
Continuation-in-part of application Ser. No. 631,761, Apr. 18, 1967. This application Mar. 2, 1970, Ser. No. 15,795
Int. Cl. C03b 25/02, 27/00
U.S. Cl. 65—182 A      6 Claims

ABSTRACT OF THE DISCLOSURE

A ceramic bed for supporting glass on a cushion of gas. The ceramic bed may be made of particles of bonded ceramic material or any suitable substance. Hot gases are fed from a supply area to the surface of the bed through channels in the ceramic bed blocks. The channels are designed to reduce or eliminate oscillation of the glass while supported on the gas over the bed.

CROSS-REFERENCE TO RELATED APPLICATIONS

This application is a continuation-in-part of my co-pending application Ser. No. 631,761, filed Apr. 18, 1967, now abandoned.

This invention relates to a method and apparatus for heating glass sheets. This apparatus and method can be used for tempering, annealing, and various other treatment of sheet glass material; for example, such as coating, filming, sintering, fusing, and chemically treating glass to change the chemical composition of the sheet surface.

It is known practice to treat glass sheets on an air support bed in a manner shown in U.S. Pat. No. 3,223,501 Fredley et al. The gas support bed therein, is formed by a plurality of metallic modules forming a common generative surface for supporting glass thereon. Another furnace for air support is that shown in Belgian Pat. No. 656,392 to Harold A. McMaster, et al.: "Apparatus for Manufacturing Glass Sheets." That patent discloses a ceramic hearth bed used as a gas support generative surface having perforations to deliver the gas. Ceramic block forms the top of a plenum chamber, which is pierced with supply channels forming a gaseous path from the plenum to the top surface of the bed. In certain sections of the bed disclosed therein, there are also exhaust channels leading from the bed surface to an exhaust system within the bed. Glass to be treated is run onto the surface thereof, and hot gas is supplied from the plenum to both support the glass and heat the surface of the glass.

It is very desirable to treat large plates of glass, such as those used for doors and panels, on a gas-support bed. Hence, this use requires a very wide bed. Glass treated on such a bed tends to oscillate in relation to the bed. This oscillation produces variations in heat transfer, producing deleterious effects on the glass. Surface damage (scratching) may result. This oscillation is particularly deleterious when treating thin glass. The thinner the glass, the more pronounced the tendency to oscillation. The improved hearth design disclosed herein is very effective for treating ⅛ inch glass.

The attendant advantages of this invention and the various embodiments thereof, will be readily appreciated and understood by reference to the following detailed description when considered in connection with the accompanying drawings, in which:

FIG. 4 is a top view of a section of the ceramic hearth bed;

FIG. 5 is a cross section of the bed of FIG. 4, taken along line II—II;

FIG. 6 is a cross section of the bed taken along line III—III.

Figure 1:
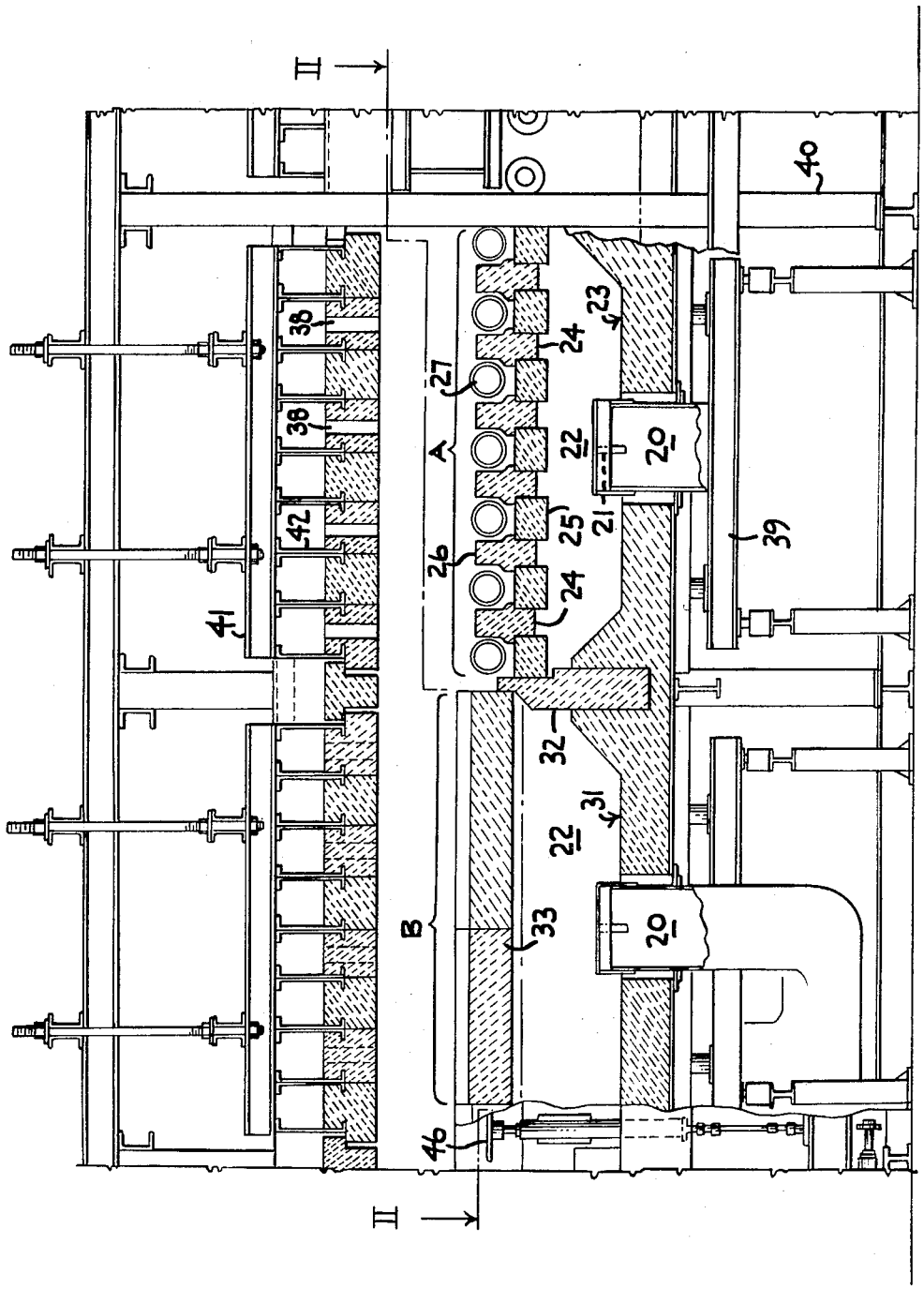
FIG. 1 is a side view, partly schematic, illustrating the ceramic hearth construction. This view is sectioned at several depths from the edge to illustrate the construction throughout the depth of the bed.
Figure 2:
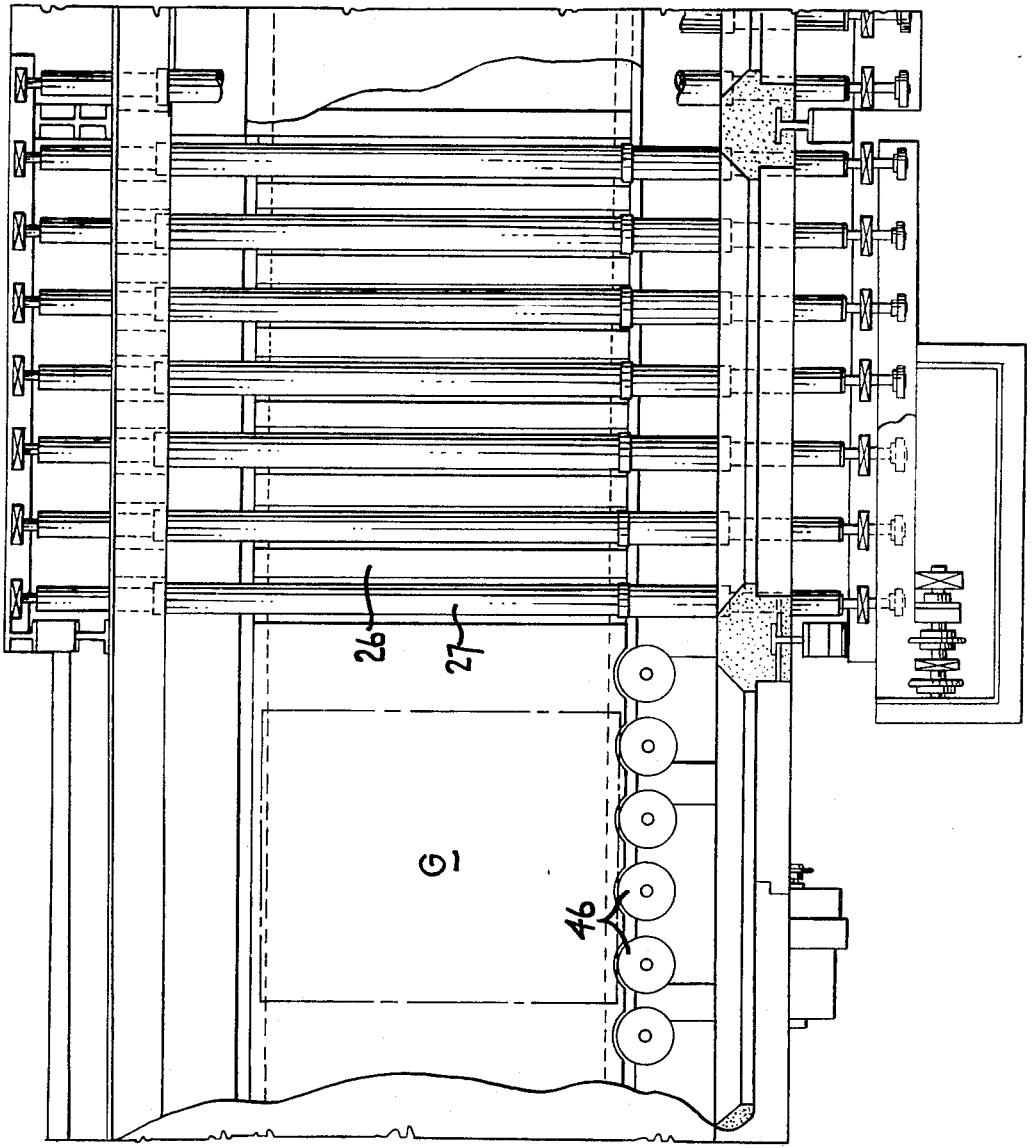
FIG. 2 is a top view of the furnace of FIG. 1, partly schematic, and sectioned in portions thereof.

Referring to the drawing, FIG. 1 shows a side view, partly schematic, and sectioned longitudinally with the direction of glass travel.

PRE-HEAT SECTION "A"

Section "A" has a plurality of roller supports for initially transporting the glass.

The pre-heat section employs partial air support in conjunction with roller conveyors for supporting and transporting the glass. Hot gas is supplied to a plenum chamber by supply ducts 20. A baffle 21 disperses the hot gases through the plenum section 22. The walls 33 of the plenum may be made by any suitable ceramic material. Hot gases circulate upwardly through apertures 24, formed by support blocks 25, and hearth blocks 26. The roller conveyors 27 are disposed within a well-like area surrounded by the ceramic hearth blocks. The glass to be transported is given partial air support due to the upward pressure of the hot gas; however, the rolls provide both partial support and a driving force to move the glass along the line. The top crests of the roller conveyors from a linear support plane with the subsequent air support section of the furnace bed.

GAS SUPPORT SECTION "B"

The total gas support section "B" has a plenum chamber 22, a topside of which is a gas generative support bed 33. The bed is supplied with inlet and exhaust passages for the support gases. Refer to FIGS. 4, 5, and 6 for a detailed drawing of these passages.

Gas inlet passages 36 communicate from the plenum to the top surface of the bed 33 to provide a gas passage for supportng gas to flow to the surface thereof.

As shown in FIG. 5, a gas-inlet passage 36 has two major portions, namely, a narrower portion communicating directly with the plenum and a wider portion communicating directly with the bed surface. A transition portion connects these two portions to provide a complete gas conduit between the plenum and the bed surface. The hot gas supports the glass and heats it to a deformation temperature for further processing.

Elongated channels 34 run through the bed across the direction of glass travel, providing a passage for the gases exhausted from the surface of the bed through ports 35.

The plenum 22 is formed by bottom wall 31 and side walls 32. The plenum chamber is enclosed by ceramic blocks 33, forming both a cover for the plenum and a gaseous support surface emitting gases to support a glass sheet thereon. A block 33 is composed of any suitable ceramic material having economical constituents and being easily formed and machined, and also having desirable heat characteristics, such as a low coefficient of thermal expansion and/or a high thermal shock resistance.

A section of the top of a bed block 33 is shown in FIG. 4. Gas supply ports 37 are interspersed with exhaust ports 35. The inlet and outlet pasages are placed so as to reduce concentrated impingement by the hot gas against the bottom surface of the sheet.

FIG. 5 shows a cross section of the bed taken along lines II—II, showing in cross section a gas supply channel. The channel is about 6 inches long and has two main sections, capped by a flared end section 37. One section is smaller in cross section than the second section, i.e., the section communicating with the plenum being the smaller in cross sectional area relative to the second section. A typical channel is .094 inch in diameter in the lower section, and .1250 inch in the upper section. The plenum end of the channel is flared to a depth of .062 inch, the top end is flared to a diameter of .31 inch in diameter and about ½ inch in length, opening into an exhaust channel. A typical exhaust channel is about .75 inch wide and 3.75 inches high, and placed about two inches from the bottom surface of the ceramic block bed. Hot gases flow from the plenum through the gas supply ports to the bed surface, across the surface, and are then withdrawn through the exhaust ports. Glass is supported on this blanket of gas and is also heated by the hot gas.

The increase in area of the second portion of the bed results in a temporary reduction in gas pressure. Gas is supplied from the plenum at about 3 ounces per square inch, although the gas-supply pressure may be about 8 ounces per square inch if the hearth is of metal, as is hereinafter explained. The gas flows from the plenum into the lower portion of the gas supply channel at approximately the same pressure. The top of the furnace is composed of ceramic block material having apertures 38 for the insertion of electric heaters. A plurality of structural members are erected to form a roof 42 and also an adjustable platform 39 upon which the ceramic bed blocks are placed.

The glass is propelled through the furnace by a plurality of disks 46 which are placed at one side of the furnace and the glass is contacted to the edge of the revolving disks. The furnace bed is tilted slightly from the horizontal to insure that the glass is held in friction engagement with the guiding disks. Other suitable driving means such as a chain with extended cross members is also contemplated. Both the rollers of the pre-heat section 27, and the rollers of the run-off section may be powered so as to provide a positive driving and transporting force for the glass.

Figure 3:
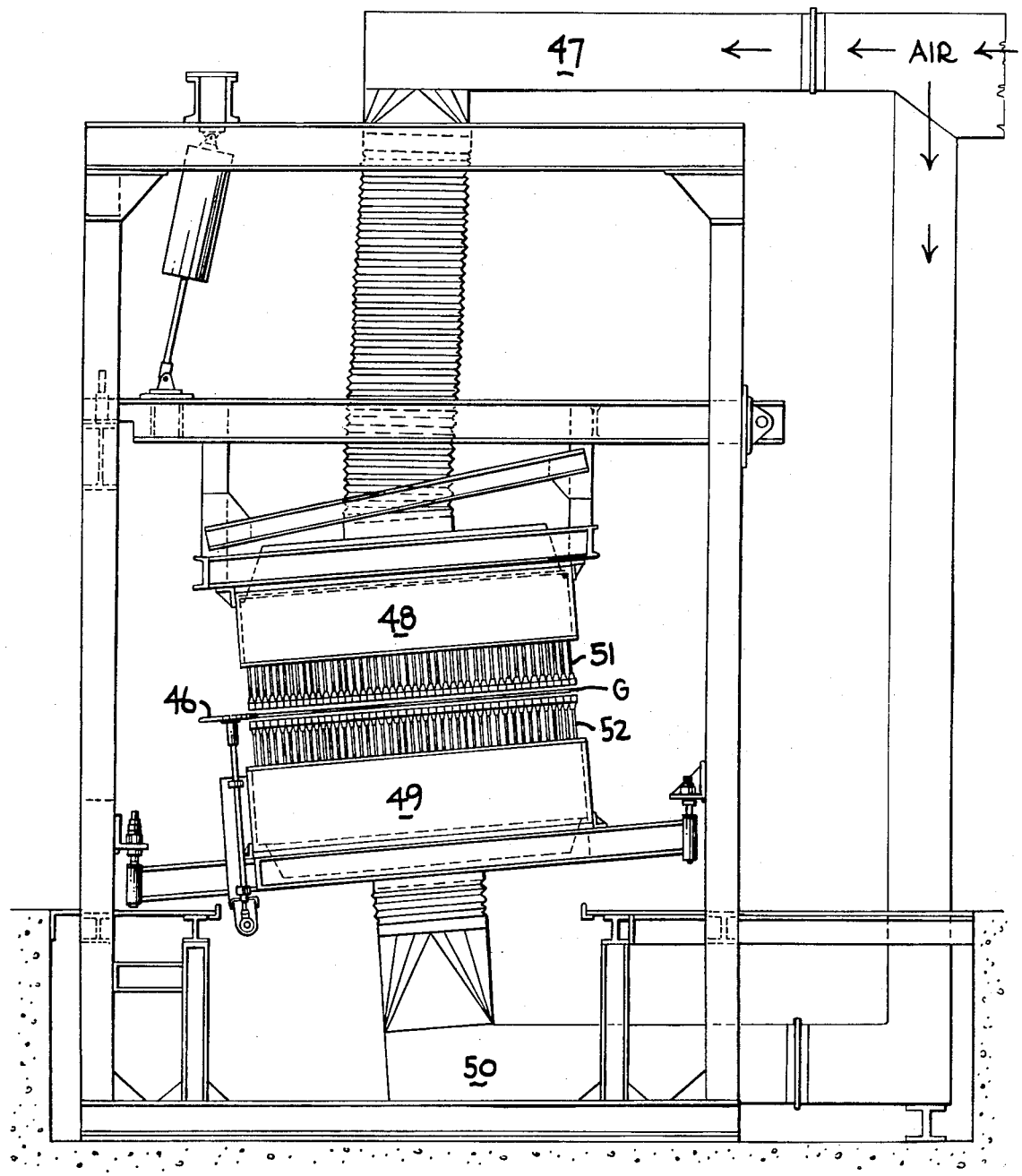
FIG. 3 is an end view, partly schematic, of a quench section used in the furnace in tempering in annealing operations.

FIG. 3 illustrates an end view of the quench section used with this furnace. A cold air supply is supplied by air duct 47, and a plenum 48. Plenum 49 is similarly supplied by air duct 50. A plurality of modules 51 and 52 supply air to the quench section. The glass to be tempered or annealed is passed from the heating section through the modules of the quench section. The quench section illustrated is a plane; however, the configuration of the cross section may be altered in the manner shown in Fredley U.S. Pat. No. 3,223,501. The glass to be treated is run out on the run-out section and quickly transferred to the quench section for further treatment. The quench section is sloped from the horizontal as shown in FIG. 3 to insure frictional engagement between the glass and the rotating disks 46 for propelling the glass along the quench.

OPERATION

The air is supplied to the plenum chambers by inlet duct 20. The plenum chamber 22 is enclosed at one section by a plurality of ceramic support blocks. The subsequent full air support section is enclosed by a ceramic block 33. Support gas enters the plenum and this air may be hot gas resulting from the oxidation or combustion of various natural gases, etc., as known in the art or other suitable gases. The hot gases flow through channels 36 to the top of the plenum; the pressure of the gas is dropped by the enlargement in the upper section of the gas channel 36. This drop in pressure has eliminated the oscillation of the glass on top of the ceramic hearth which often caused scratching or seriously interfered with the uniform heat transfer between the supporting gas and the glass. A typical plenum pressure would be 4.5 inches of water.

The enlargement of the area of the gas supply channels results in the dampening and/or elimination of the oscillation of the glass.

Although the invention has been hereinabove described as being used with a ceramic bed, those skilled in the art will also appreciate that the bed may be made of any suitable heat-resistant material, such as stainless steel; the principle of the invention, i.e., the providing of passages having an increased-diameter portion to dampen or eliminate oscillation of the work as a result of gas-feed pressure variations, remains the same. It is similarly to be appreciated that the work does not necessarily comprise a sheet of glass; even when the work is a sheet of metal or plastic or other non-fragile material, it is desirable to minimize or substantially eliminate oscillation, as an aid in effecting necessary handling of the work. The invention is of particular usefulness, however, in the handling of sheets of glass or other fragile material that are relatively thin, such as 0.060 to 0.130 inch in thickness, since glass sheets of such thickness have less strength and are thus more likely to be scratched, broken, or otherwise experience interference with their reliable transport during processing if oscillation is uncontrolled than are glass sheets or plates of greater thickness.

What I claim is:

1. In an apparatus for supporting sheets on a hot gas and for heating said sheets with said hot gas including a bed of heat-resistant material overlying and enclosing a plenum chamber and having an upper surface positioned below the sheet to be supported, said bed having a plurality of elongated gas supply channels extending from said plenum chamber to openings provided in the surface of said bed, the improvement comprising elongated gas supply channels in said bed having a lower portion extending upwardly from the plenum chamber and an upper portion axially aligned with and connected to and extending upwardly from said lower portion to the openings in the surface of said bed, said upper portion of each of said gas supply channels having a substantially greater cross-sectional area than that of said lower portion thereof, the cross-sectional area and the length of each said upper portion being sufficient to reduce the pressure of the gas flowing thereinto from said lower portion and to dampen the oscillation of the glass sheet supported on the hot gas above said bed, the side walls of said upper and lower portions of said gas supply channels being substantially parallel to one another, and means for supplying a hot gas to said plenum chamber at varying pressures whereby the hot gas introduced into said lower portion at varying pressures is expanded in said upper portion until said varying pressure of said hot gas is dampened and said expanded hot gas, upon flowing from the openings in said bed surface support a sheet at deformation temperature at a substantially constant distance above the surface of said bed.

2. An improvement as defined in claim 1, characterized in that said bed of heat-resistant material is a ceramic bed.

3. An improvement as defined in claim 2, further characterized in that said sheets are of glass and in that said apparatus is such that said sheets are heated to their deformation temperature.

4. In an apparatus for treating a sheet wherein said sheet is supported on a gas at a substantially uniform distance above the surface of a hearth member of heat-resistant material which encloses one side of a plenum for supplying said supporting gas at varying pressures, the improvement which comprises:

a hearth member of heat-resistant material having a plurality of spaced elongated gas supply channels, each extending from said plenum to the surface of said hearth member and a plurality of gas exhaust passageways adjacent and interspersed between said gas supply channels for withdrawing gas from the region adjacent to the surface of said hearth surface, said gas supply channels each being a conduit composed of linearly aligned upper and lower sections having a common longitudinal axis and side walls substantially parallel to one another and being interconnected to permit the flow of gas along paths parallel to said longitudinal axis throughout the entire extent of said aligned sections, the lowermost of said aligned sections being adjacent to said plenum and the uppermost of said aligned sections being adjacent to the surface of said ceramic hearth, each of said aligned sections being of substantially uniform cross-sectional area, the cross-sectional area of said lowermost section being substantially less than that of said uppermost section, the cross-sectional area and the length of each said uppermost section being sufficient to reduce the pressure of the gas flowing thereinto from said lowermost section and to dampen the oscillation of the sheet supported on the gas above said hearth member, whereby the varying pressure of the gas in said lowermost section is dampened upon the expansion thereof in said uppermost section until said sheet is supported at substantially a uniform distance above the surface of said bed.

5. An improvement as defined in claim 4, characterized in that said bed of heat-resistant material is a ceramic bed.

6. An improvement as defined in claim 5, further characterized in that said sheets are of glass.

References Cited

UNITED STATES PATENTS

| | | | |
|---|---|---|---|
| 1,622,817 | 3/1927 | Waldron | 65—182 A X |
| 3,223,501 | 12/1965 | Fredley et al. | 65—25 A |
| 3,332,760 | 7/1957 | McMaster et al. | 65—25 A |

ARTHUR D. KELLOGG, Primary Examiner

U.S. Cl. X.R.

65—25 A, 104, 107, 348

UNITED STATES PATENT OFFICE
CERTIFICATE OF CORRECTION

Patent No. 3,682,610                      Dated August 8, 1972

Inventor(s) George W. Misson

It is certified that error appears in the above-identified patent and that said Letters Patent are hereby corrected as shown below:

In the References Cited, Column 6, line 17 should read

-- 3,332,760      7/1967      McMaster et al.      65—25 A --

Column 2, line 70, "pasages" should read -- passages --.

Signed and sealed this 30th day of January 1973.

(SEAL)
Attest:

EDWARD M. FLETCHER, JR.                  ROBERT GOTTSCHALK
Attesting Officer                            Commissioner of Patents